United States Patent

Proctor

Patent Number: 5,111,769
Date of Patent: May 12, 1992

[54] FARROWING CRATES

[76] Inventor: Keith Proctor, The Grove, Greenhill, South Littleton, Evesham, United Kingdom

[21] Appl. No.: 663,859
[22] PCT Filed: Oct. 20, 1989
[86] PCT No.: PCT/GB89/01243
§ 371 Date: Mar. 12, 1991
§ 102(e) Date: Mar. 12, 1991
[87] PCT Pub. No.: WO90/04327
PCT Pub. Date: May 3, 1990

[30] Foreign Application Priority Data

| Oct. 22, 1988 | [GB] | United Kingdom | 8824791 |
| Jan. 9, 1989 | [GB] | United Kingdom | 8900379 |
| Mar. 15, 1989 | [GB] | United Kingdom | 8905895 |

[51] Int. Cl.$^5$ ............................................. A01D 1/02
[52] U.S. Cl. .................................... 119/20; 119/27
[58] Field of Search ................... 119/16, 20, 98, 27

[56] References Cited

U.S. PATENT DOCUMENTS

| 3,941,093 | 3/1976 | Sievers et al. | 119/20 |
| 4,351,272 | 9/1982 | McDonald | 119/20 |
| 4,502,414 | 3/1985 | Paulsen | 119/20 |
| 4,528,943 | 8/1985 | Proctor | 119/20 |

FOREIGN PATENT DOCUMENTS

| 0045703 | 2/1982 | European Pat. Off. |  |
| 0112098 | 6/1984 | European Pat. Off. |  |
| 1607119 | 8/1970 | Fed. Rep. of Germany |  |
| 2431564 | 2/1976 | Fed. Rep. of Germany | 119/20 |
| 2501908 | 7/1976 | Fed. Rep. of Germany | 119/20 |
| 2501908 | 7/1976 | Fed. Rep. of Germany |  |
| 2944940 | 5/1981 | Fed. Rep. of Germany |  |
| 2927523 | 1/1987 | Fed. Rep. of Germany | 119/20 |

*Primary Examiner*—John G. Weiss
*Attorney, Agent, or Firm*—Young & Thompson

[57] ABSTRACT

In order to confine a sow in such a manner as to allow only limited movement of the sow, the crate has two side members (2, 3) each of which is pivoted at a corresponding end about a respective vertical axis and between which the sow is positioned in use. Each of the side members (2, 3) comprising a rigid frame incorporating at least two horizontal rails. A linkage system (11) couples together the side members (2, 3) such that pivoting of one of the side members in one direction about the associated vertical axis causes corresponding pivoting of the other side member in the opposite direction about the associated vertical axis. Furthermore a damper (17) is incorporated in the linkage system (11) so as to control pivotal movement of the side members (2, 3) in such a manner that, when the sow applies her weight to one of the side members on lying down within the crate, the side member gives way gradually under the sow's weight in order to lower the sow controllably to the ground. A particularly efficient farrowing crate is provided by this arrangement.

8 Claims, 3 Drawing Sheets

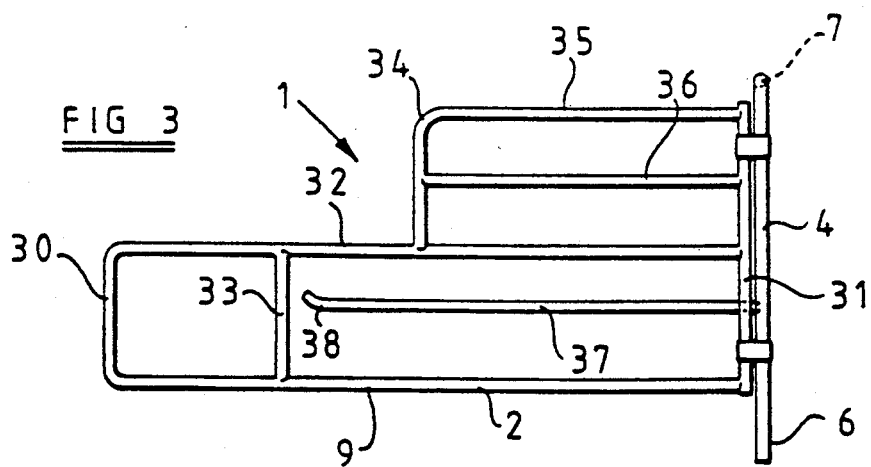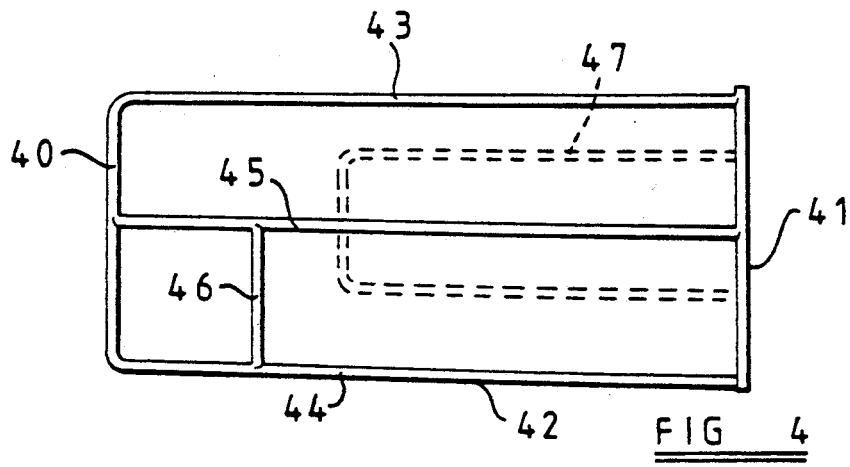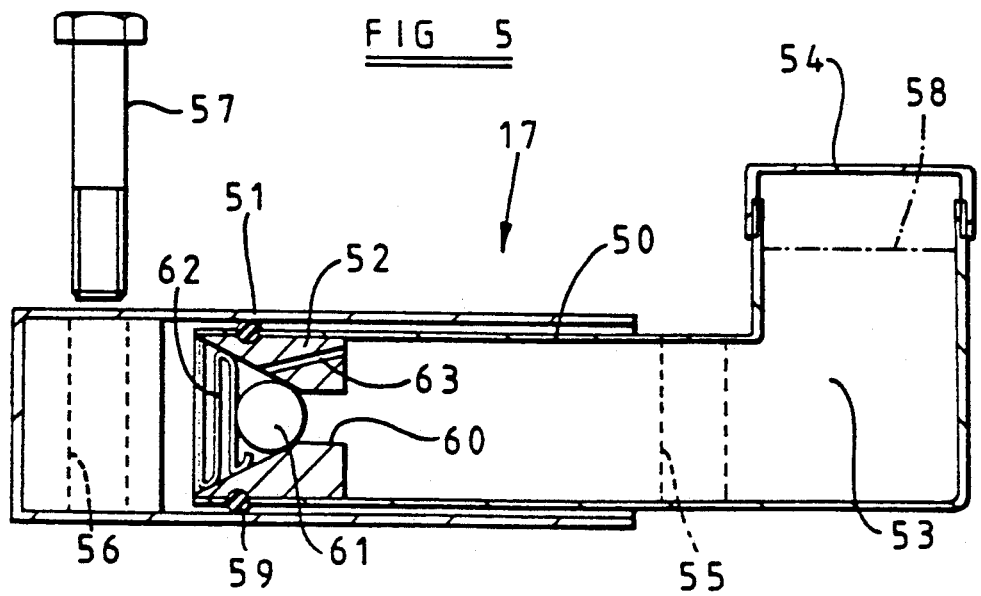

FARROWING CRATES

FIELD OF THE INVENTION

This invention relates to farrowing crates for use by pig farmers to confine a sow during and after farrowing so as to lessen the risk of a piglet being accidentally crushed by the sow.

BACKGROUND OF THE INVENTION

A farrowing crate for this purpose is described in the applicant's British Patent Specification No. 2131268 and is of a type comprising two side members, a front member and a back member. This crate has proved highly satisfactory in use, and is generally acknowledged as being of a design which minimises the number of piglets lost by being accidentally crushed by the sow.

However, some farmers favour a different type of crate which is intended for use when the sow is tethered to a wall and which comprises two side members pivoted at their ends adjacent the wall about respective vertical axes. With this type of crate, a back member need not be provided since the sow is tethered. However, the movements of the sow are rigidly confined by virtue of the fact that the free ends of the side members cannot be moved apart by the sow, and moreover there is still a substantial risk that piglets will be crushed when a sow lies down in such a crate.

It is an object of the invention to provide an improved farrowing crate of this general type which is more efficient in use.

SUMMARY OF THE INVENTION

According to the present invention there is provided a farrowing crate for confining a sow in such a manner as to allow only limited movement of the sow, the crate having two side members each of which is pivoted at a corresponding end about a respective vertical axis and between which the sow is positioned in use, each of the side members comprising a rigid frame incorporating at least two horizontal rails, and linkage means coupling together the side members such that pivoting of one of the side members in one direction about the associated vertical axis causes corresponding pivoting of the other side member in the opposite direction about the associated vertical axis.

The invention also provides a farrowing crate for confining a sow in such a manner as to allow only limited movement of the sow, the crate having two side members each of which is pivoted at a corresponding end about a respective vertical axis and between which the sow is positioned in use, each of the side members comprising a rigid frame incorporating at least two horizontal rails, and damping means coupled to the side members to control pivotal movement of the side members in such a manner that, when the sow applies her weight to one of the side members on lying down within the crate, the side member gives way gradually under the sow's weight in order to lower the sow controllably to the ground.

In a preferred embodiment of the invention each of the side members has an inwardly projecting part for supporting the sow from below as she lies down within the crate.

Furthermore the linkage means preferably includes biasing means, such as a tension spring, for returning the side members to a rest position when a pivot force causing pivoting of the side members is removed.

The linkage means may include two fixed links each of which is fixedly attached to a respective one of the side members and extends inwardly of the side member, and a pivot link interconnecting the fixed links and being pivotally connected to each fixed link about a respective vertical axis.

The damping means is preferably such as to heavily damp outward movement of the side members under the sow's full weight whilst providing relatively slight resistance to inward movement of the side members.

The damping means may comprise a hydraulic damper having inner and outer sleeves slidable within one another and closed at their free ends, and an apertured piston within the inner sleeve through which hydraulic fluid is forced on relative movement of the inner and outer sleeves.

The damping means preferably includes a valve member movable by hydraulic fluid pressure against the action of a spring to vary the throughflow cross-section through the piston, whereby outward movement of the side members under the sow's full weight is heavily damped, whereas outward movement of the side members when pushed against by the sow relatively lightly is only lightly damped.

Furthermore, in order to prevent the sow from turning round within the crate, it may be advantageous to provide two fixed side rails which do not pivot with the side members and between which the sow is positioned in use. The fixed side rails may be curved outwardly and/or upwardly at their rear ends.

BRIEF DESCRIPTION OF THE DRAWINGS

In order that the invention may be more fully understood, a farrowing crate in accordance with the invention will now be described, by way of example, with reference to the accompanying drawings, in which:

FIG. 3 is a side view of the crate;
FIG. 4 is a side view of an alternative form of side member;
FIG. 5 is a schematic diagram of a hydraulic damper used in the crate.

DETAILED DESCRIPTION OF THE INVENTION

Figure 1:
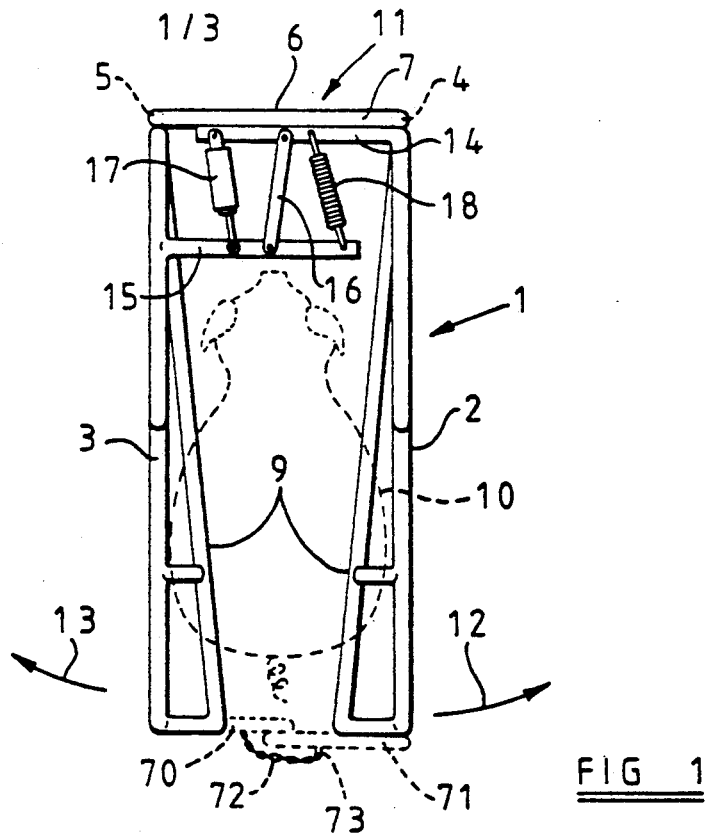
FIG. 1 is a plan view of the crate in a closed position.

The illustrated crate 1 comprises two side members 2 and 3 pivoted to two uprights 4 and 5 of an inverted U-shaped fixed frame 6 having a cross-bar 7. Each side member 2 or 3 has a bottom rail 9 which projects inwardly, particularly in the vicinity of the rear of the crate, in order to support the sow 10 from below as she lies down within the crate.

The side members 2 and 3 are coupled together by a linkage system 11 such that pivoting of the side member 2 in the direction of the arrow 12 in FIG. 1 causes corresponding pivoting of the side member 3 in the direction of the arrow 13 in FIG. 1. The linkage system 11 comprises two fixed links 14 and 15 welded to the side members 2 and 3 respectively, a pivot link 16 pivotally connected to each fixed link 14 or 15 about a respective vertical axis, a hydraulic damper 17 similarly connected to both fixed links 14 and 15, and a tension spring 18 connected between the fixed links 14 and 15.

In use of the crate the sow 10 is normally accommodated between the side members 2 and 3 as shown in FIG. 1 and is tethered to a wall or other fixing point in the vicinity of the fixed frame 6. When the sow lies down within the crate to suckle her piglets her weight will bear against one or other of the side members 2 and 3 and will tend to pivot the side member outwardly. This will occur whether the sow lies down by falling to one side or by means of a straight-down movement by bending at the knees. In the case of a straight-down movement, the sow's body will contact the inwardly projecting bottom rails 9 by virtue of the fact that the sow's body is wider than the distance between the bottom rails 9 in the closed position of the crate shown in FIG. 1. Thus, as the sow lies down within the crate, both side members pivot outwardly to a corresponding extent by virtue of the pivot link 16, with the side members 2 and 3 giving way gradually under the sow's weight by virtue of the damper 17 in order to lower the sow controllably to the ground. This allows any piglets which would otherwise be crushed to escape beneath the bottom rails 9. Furthermore, when the sow is lying down the crate is kept in an open position as shown in FIG. 2, and the piglets have free access to the sow's drills.

When the sow subsequently removes her weight from the side members 2 and 3, the side members are returned towards the closed position by the action of the tension spring 18.

Figure 2:
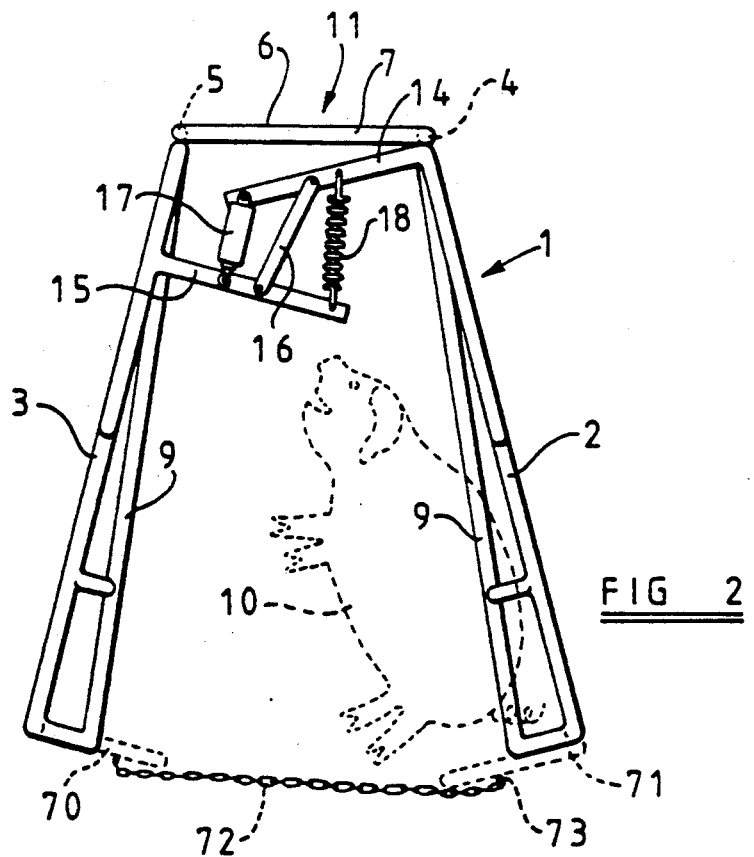
FIG. 2 is plan view of the crate in an open position.

By virtue of the fact that the tension spring 18 itself is pivoted during movement of the side members 2 and 3 between the open and closed positions, the difference between the contracted and extended lengths of the spring 18 is relatively small and the restoring force exerted by the spring is substantially constant over the range which the side members are pivoted between the positions of FIGS. 1 and 2. Furthermore the illustrated linkage system 11 is disposed above a level at which it could interfere with movement of the sow and such that no part of the linkage system 11 extends forwardly of the fixed frame 6 in either the closed or open positions of the crate.

Referring to FIG. 3 is will be seen that the side member 2 (as also the side member 3) comprises a U-shaped portion 30 welded at its ends to an upright 31 and forming both the bottom rail 9 and an upper rail 32 parallel to the bottom rail 9. A strengthening member 33 is welded between the upper rail 32 and the bottom rail 9. Furthermore an upper guard 34 comprising a bent rail 35 and a horizontal rail 36 is welded to the upright 31 and the upper rail 32. In order to prevent the sow from turning round within the crate, two fixed side rails 37 which do not pivot with the side members 2 and 3 are provided on either side of the sow. Each fixed side rail 37 is attached to a respective one of the uprights 4 and 5 of the fixed frame 6 and has an end 38 which is curved upwardly and outwardly to prevent injury to the sow. It should be appreciated that, because the bottom rail 9 extends inwardly towards the rear as shown in FIGS. 1 and 2, the rear of the U-shaped portion 30 can be considered as being twisted in relation to the plane containing the front part of the side member 2.

FIG. 4 shows an alternative form of side member 42 which may be substituted for the side member 2 or 3. The side member 42 comprises an upright 41, a U-shaped member 40 defining top and bottom rails 43 and 44, a middle rail 45 and a strengthening member 46. A U-shaped fixed member 47 attached to the corresponding upright 4 or 5 of the fixed frame 6 is also shown in broken lines in FIG. 4, and is intended to replace the fixed side rail 37 on either side of the sow in such an arrangement.

Although not shown in FIG. 3, it should be understood that the linkage system 11 extends between the rails 35 of the side members 2 and 3. Furthermore the hydraulic damper 17 is a modified form of the damper described in British Patent Specification No. 2131268 as shown diagrammatically in FIG. 5. Referring to FIG. 5, the damper 17 comprises inner and outer sleeves 50 and 51 slidable within one another and closed off at their ends, and an apertured piston 52 within the inner sleeve 50. A hydraulic oil reservoir 53 having an upper opening closed off by a cap 54 is provided at the end of the inner sleeve 50. Furthermore swivel points 55 and 56 are provided through the inner sleeve 50 and the outer sleeve 51 respectively for the purposes of establishing the required pivotal connections with the fixed links 14 and 15 by means of bolts, such as 57.

The space within the inner and outer sleeves 50 and 51 and the reservoir 53 is filled with hydraulic oil up to the level 58. Furthermore the piston 52 closes off the end of the inner sleeve 50 and is surrounded by an oil seal 59 which is a sliding fit within the outer sleeve 51. The piston 52 has an aperture 60 extending therethrough provided with a valve member 61 movable by hydraulic oil pressure against the action of a spring 62 to vary the throughflow cross-section through the piston. A bypass 63 also extends through the piston 52 to provide pressure equalisation across the valve member 61.

The manner in which the hydraulic damper 17 operates is broadly similar to the manner of operation of damper described in the prior specification, and will not therefore be described in detail. However, the action of the damper will be such as to damp outward movement of the side members 2 and 3 from the closed position shown in FIG. 1 to the open position shown in FIG. 2 in such a manner that the degree of damping increases with the force applied to the side members 2 and 3 and the rate of increase of this force, whilst enabling the side members 2 and 3 to move back freely towards the closed position on release of the applied force. Furthermore the action of the damper 17 is velocity-sensitive so that sudden outward movements of the side members 2 and 3, as might be caused by the sow applying her full weight to the side members 2 and 3 on lying down, will tend to be damped much more heavily than gradual outward movements of the side members 2 and 3, as might be caused by the sow pushing against the side members 2 and 3 relatively lightly. This has the effect that lying down movements of the sow are reliably controlled, whereas the sow's other movements are not unduly restricted so that the sow does not suffer unnecessary anxiety due to discomfort.

Moreover the construction of the crate is preferably such that the side members 2 and 3 can be opened out widely, and fixed in the open position, and such that the fixed side rails 37 can be easily detached, in order to provide an open floor area for the piglets when there is no longer any risk of overlying of the piglets.

In a variant of the above described crate, a separate back member or gate is provided to prevent the sow from escaping from the rear of the crate. It is of course unnecessary for the sow to be tethered in such a crate.

In a further variant of the above described crate, as indicated in broken lines in FIGS. 1 and 2, two inturned generally C-shaped members 70 and 71 are welded to the side members 2 and 3 so that the members 70 and 71 overlap in the closed position of the crate shown in FIG. 1. When the crate opens, the members 70 and 71 are moved apart until further movement apart is prevented by a chain 72 welded at one end to the member 70 and fastened at the other end to a hook 73 on the member 71. The maximum distance by which the members 70 and 71 may be moved apart may be varied by adjusting the position at which a link of the chain 72 is attached to the hook 73. The members 70 and 71 and the chain 72 serve to confine the sow within the crate, the chain 72 being fastened in position after introduction of the sow into the crate. In this variant it is unnecessary to provide a tethering point for the sow or a separate rear gate assembly.

Figure 6:
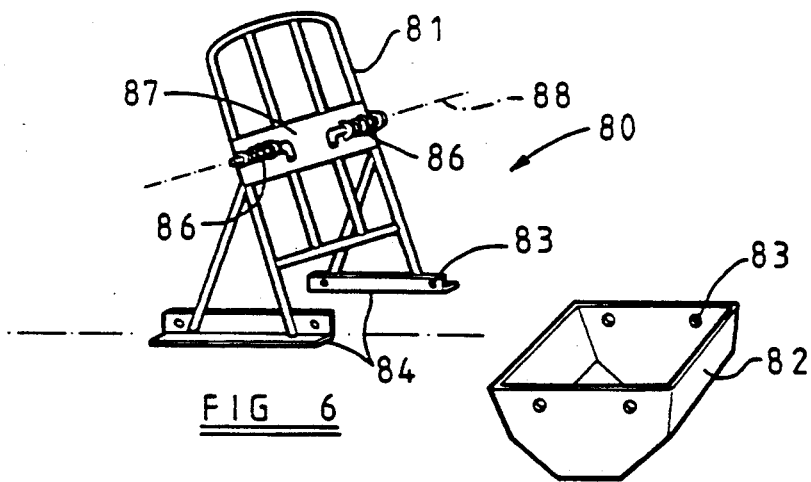
FIG. 6 is a perspective view from one side and the front of a trough assembly for use with the crate assembly, with the trough removed from its sub-frame.
Figure 7:
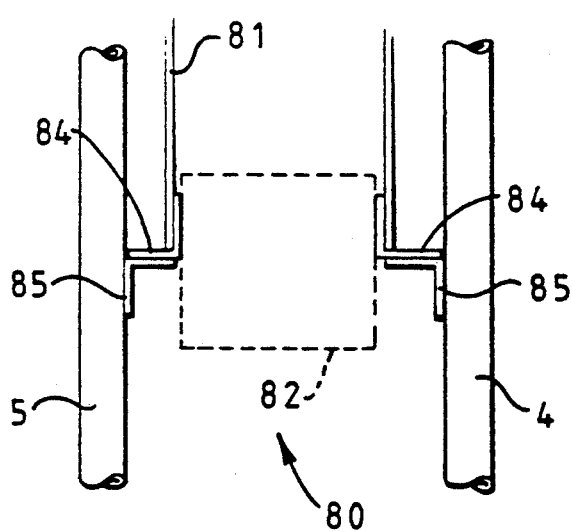
FIG. 7 is a front view of part of the trough assembly attached to the crate.
Figure 8:
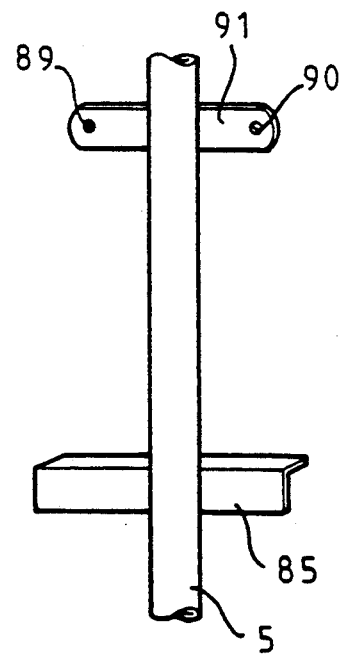
FIG. 8 is a side view of an upright of the crate.

Referring to FIGS. 6 to 8 a trough assembly 80 may be provided for the crate which includes a sub-frame 81 and a trough 82 connectable to the sub-frame 81 by bolts (not shown) extending through bolt holes 83 in the sub-frame 81 and the trough 82. It will be appreciated that the trough is readily replaceable by other forms of trough and adjustable in inclination (by provision of further bolt holes in the sub-frame) to suit the user.

The sub-frame 81 includes horizontal slide members 84 made from angle iron which are provided to slidingly engage similar horizontal slide members 85 welded to the uprights 4 and 5 of the crate, as shown in FIG. 7. Furthermore the sub-frame 81 includes two spring bolts 86 attached to a backing plate 87 and extending along a connection axis 88. The bolts 86 are engageable in holes 89 or 90 provided in connection members 91 welded to the uprights 4 and 5 above the slide members 85, as shown in FIG. 8. Furthermore the bolts 86 are releasable from the holes 89 or 90 against a spring force to permit the sub-frame 81 to be lifted off the slide members 85 to detach the trough assembly 80 from the crate, or to enable adjustment of the position of the trough assembly 80.

To adjust the position of the trough assembly 80 backwardly from a forward position in which the bolts 86 engage within the holes 90 in the connection members 91 and the sub-frame 81 is prevented from pivoting by interengagement of the slide members 84 and 85, the bolts 86 are disengaged from the holes 90 and at the same time the assembly 80 is moved backwards by sliding the slide members 84 along the slide members 85 until the bolts 86 spring into engagement with the holes 89 in the connection members 91. Thus the connection established by the bolts 86 is adjustable between a first connection axis defined by the holes 90 and a second connection axis defined by the holes 89, and the trough 82 is moved correspondingly forwardly or backwardly relative to the crate by such adjustment. The backward position of the trough 82 will generally be selected for small sows so that the sow is brought forward in relation to the tapered shape of the crate as shown in FIG. 2.

I claim:

1. A farrowing crate for confining a sow in such a manner as to allow only limited movement of the sow, the crate having two side members (2, 3) each of which is pivoted at a corresponding end about a respective vertical axis and between which the sow is positioned in use, wherein each of the side members (2, 3) comprises a rigid frame incorporating at least two horizontal rails (9, 32, 35, 36), and linkage means (11) coupling together the side members (2, 3) such that pivoting of one of the side members (2, 3) in one direction about the associated vertical axis causes corresponding pivoting of the other side member (2, 3) in the opposite direction about the associated vertical axis.

2. A farrowing crate according to claim 1, wherein each of the side members (2, 3) has an inwardly projecting part (9) for supporting the sow from below as the sow lies down within the crate.

3. A farrowing crate according to claim 1, wherein the linkage means (11) includes biasing means (18) for returning the side members (2, 3) to a rest position when a pivot force causing pivoting of the side members (2, 3) is removed.

4. A farrowing crate according to claim 1, wherein the linkage means (11) includes two fixed links (14, 15) each of which is fixedly attached to a respective one of the side members (2, 3) and extends inwardly of the side member, and a pivot link (16) interconnecting the fixed links (14, 15) and being pivotally connected to each fixed link about a respective vertical axis.

5. A farrowing crate for confining a sow in such a manner as to allow only limited movement of the sow, the crate having two side members (2, 3) each of which is pivoted at a corresponding end about a respective vertical axis and between which the sow is positioned in use, wherein each of the side members (2, 3) comprises a rigid frame incorporating at least two horizontal rails (9, 32, 35, 36), and damping means (17) coupled to the side members (2, 3) to control pivotal movement of the side members (2, 3) in such a manner that, when the sow applies her weight to one of the side members (2, 3) on lying down within the crate, the side member gives way gradually under the sow's weight in order to lower the sow controllably to the ground.

6. A farrowing crate according to claim 5, wherein the damping means (17) is such as to heavily damp outward movement of the side members (2, 3) under the sow's full weight whilst providing relatively slight resistance to inward movement of the side members (2, 3).

7. A farrowing crate according to claim 5 wherein the damping means comprises a hydraulic damper (17) having inner and outer sleeves (50, 51) slidable within one another and closed at their free ends, and an apertured piston (52) within the inner sleeve (50) through which hydraulic fluid is forced on relative movement of the inner and outer sleeves (50, 51).

8. A farrowing crate according to claim 7, wherein the damping means (17) includes a valve member (61) movable by hydraulic fluid pressure against the action of a spring (62) to vary the throughflow cross-section through the piston (52).

* * * * *